United States Patent [19]
Yamada

[11] Patent Number: 5,884,937
[45] Date of Patent: Mar. 23, 1999

[54] AIR BAG DEVICE

[75] Inventor: Shuji Yamada, Susono, Japan

[73] Assignee: Toyota Jidosha Kabushiki Kaisha, Toyota, Japan

[21] Appl. No.: 756,530

[22] Filed: Nov. 26, 1996

[30] Foreign Application Priority Data

Nov. 12, 1995 [JP] Japan ................................. 7-321583

[51] Int. Cl.⁶ ............................................. B60R 21/22
[52] U.S. Cl. ................................ 280/730.2; 280/743.1
[58] Field of Search ........................... 280/730.1, 730.2, 280/743.1, 728.1

[56] References Cited

U.S. PATENT DOCUMENTS

| | | | |
|---|---|---|---|
| 3,731,949 | 5/1973 | Radke . | |
| 5,322,322 | 6/1994 | Bark et al. | 280/730.2 |
| 5,333,898 | 8/1994 | Stutz . | |
| 5,540,459 | 7/1996 | Daniel | 280/730.2 |
| 5,588,672 | 12/1996 | Karlow et al. | 280/730.2 |
| 5,605,346 | 2/1997 | Cheung et al. | 280/730.2 |

FOREIGN PATENT DOCUMENTS

| | | |
|---|---|---|
| 584 781 A1 | 8/1992 | European Pat. Off. . |
| 6-227340 | 8/1994 | Japan ................................. 280/730.2 |
| 6-340241 | 12/1994 | Japan . |
| 2222621 | 11/1972 | United Kingdom . |
| 4307175 A1 | 9/1993 | United Kingdom . |
| 2297950 | 8/1996 | United Kingdom . |

*Primary Examiner*—Paul N. Dickson
*Attorney, Agent, or Firm*—Pillsbury Madison & Sutro LLP

[57] ABSTRACT

An air bag device which, at the time of a collision, unfolds a curtain-shaped air bag body which is mounted and accommodated at a roof side rail of a vehicle, including: an air bag body having a roof side rail mounting portion which is mounted to the roof side rail and a pillar mounting portion which is mounted to at least one of a front pillar and a rear pillar, and the roof side rail mounting portion and the pillar mounting portion are formed on a same straight line, and a curtain-shaped bag body main body is formed beneath the roof side rail mounting portion and the pillar mounting portion, and the air bag body is mounted and accommodated by being folded from bottom to top and thereafter by being bent so as to run along the roof side rail and the at least one of the front pillar and the rear pillar.

23 Claims, 8 Drawing Sheets

FIG. 8
PRIOR ART

AIR BAG DEVICE

BACKGROUND OF THE INVENTION

1. Field of the Invention

The present invention relates to an air bag device, and in particular, to an air bag device having a curtain-shaped air bag body which is mounted and accommodated so as to extend between a front pillar and a roof side rail of a vehicle.

2. Description of the Prior Art

There exist conventional air bag devices for vehicles which, at the time of a collision, unfold a curtain-shaped air bag body which is mounted and accommodated at the roof side rail of the vehicle. An example of such an air bag device is disclosed in Japanese Patent Application Laid-Open (JP-A) No. 6-340241.

Figure 8:
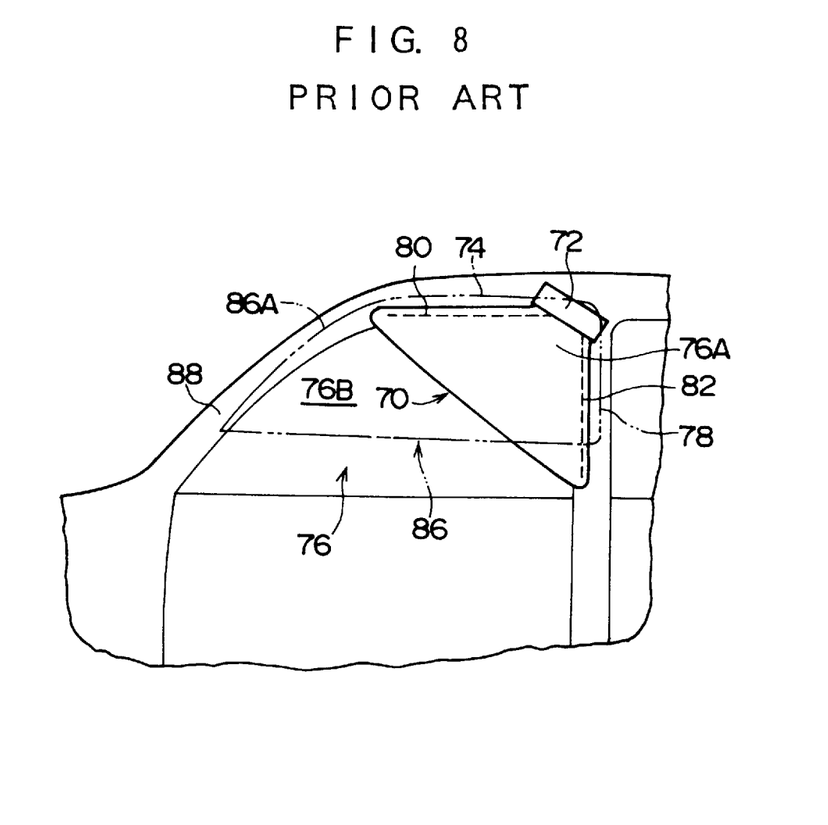
FIG. 8 is a schematic side view illustrating a front portion of a vehicle to which an air bag device relating to a conventional embodiment is applied.

As illustrated in FIG. 8, in the air bag device of JP-A No. 6-340241, a housing 72 which accommodates an air bag body 70 is mounted to a roof side rail 74. The air bag body 70 is accommodated in a folded state within the housing 72. The housing 72 is positioned at a rear, upper corner 76A of a side window 76. Two long, thin guide elements 80, 82 extend from the housing 72 along the roof side rail 74 and a B pillar 78. A plurality of retaining elements of the air bag body 70 move slidingly along the guide elements 80, 82, and the air bag body 70 unfolds.

However, the air bag body 70 of the air bag device cannot cover a front, upper portion 76B of the side window 76. As a result, the entire region of the substantial upper half of the side window 76 may be covered by an air bag body 86 as illustrated by the imaginary line in FIG. 8. In this case, an upper side 86A of the air bag body 86 forms a curve along a line extending from a front pillar 88 (also called an "A pillar") to the roof side rail 74, such that the air bag body 86 is mounted so as to extend from the front pillar 88 to the roof side rail 74. Further, when the air bag body 86 is to be accommodated in a housing (unillustrated) which is mounted so as to extend between the front pillar 88 and the roof side rail 74, the air bag body 86 is folded, for example, in a bellows-like shape from the lower side toward the upper side thereof, and is accommodated in the housing. However, because the mounting portion runs along the front pillar 88, it is difficult to fold up the air bag body 86 to a uniform thickness, and the ease and convenience of mounting and accommodating the air bag body 86 deteriorates.

SUMMARY OF THE INVENTION

In view of the aforementioned, an object of the present invention is to provide an air bag device in which the ease and convenience of mounting and accommodating an air bag body, which is accommodated at a roof side rail and at least one of a front pillar and a rear pillar, can be improved.

The present invention is an air bag device which, at the time of a collision, unfolds a curtain-shaped air bag body which is mounted and accommodated at a roof side rail of a vehicle, comprising: an air bag body having a roof side rail mounting portion which is mounted to the roof side rail and a pillar mounting portion which is mounted to at least one of a front pillar and a rear pillar, and the roof side rail mounting portion and the pillar mounting portion are formed on a same straight line, and a curtain-shaped bag body main body is formed beneath the roof side rail mounting portion and the pillar mounting portion, and the air bag body is mounted and accommodated by being folded from bottom to top and thereafter by being bent so as to run along the roof side rail and the at least one of the front pillar and the rear pillar.

In accordance with the present invention, when the air bag body is to be mounted and stored at the roof side rail and the at least one of the front pillar and the rear pillar, the air bag body is folded from bottom to top, and thereafter, is bent so as to run along the roof side rail and the at least one of the front pillar and the rear pillar. Therefore, the ease and convenience of mounting and accommodating the air bag body, which is accommodated at the roof side rail and the at least one of the front pillar and the rear pillar, can be improved.

DESCRIPTION OF THE PREFERRED EMBODIMENTS

An embodiment of an air bag device relating to the present invention will be described hereinafter with reference to FIGS. 1 through 6.

In the figures, the arrow FR points toward the front of the vehicle, the arrow UP points toward the top of the vehicle, and the arrow IN points inwardly in the transverse direction of the vehicle.

Figure 6:
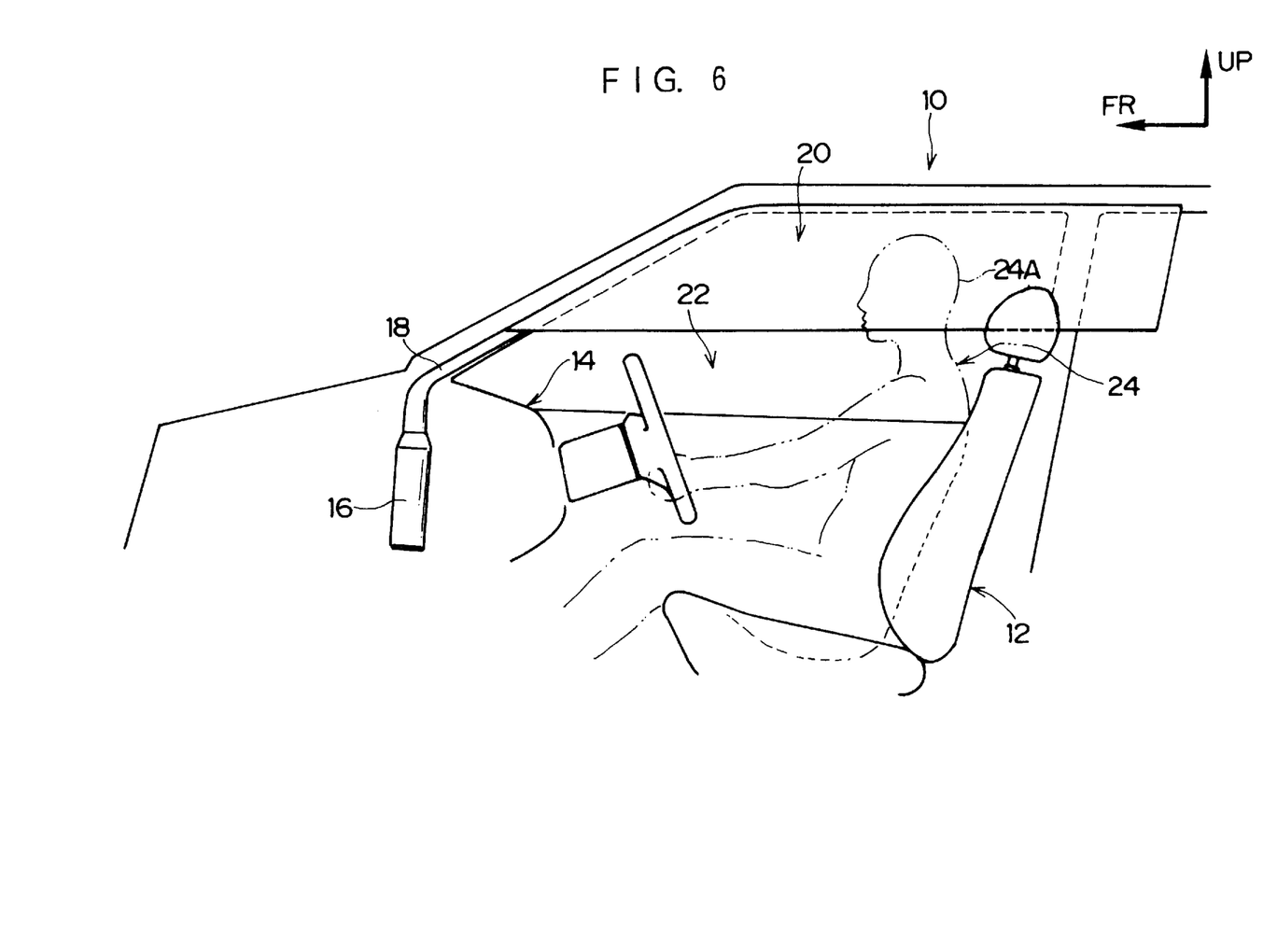
FIG. 6 is a schematic side view illustrating a front portion of a vehicle to which the air bag device relating to the embodiment of the present invention is applied.

As illustrated in FIG. 6, in an air bag device relating to the present embodiment, an inflator 16 is disposed within an instrument panel 14 which is positioned substantially in front of a driver's seat 12 of a vehicle 10. When an unillustrated acceleration sensor detects acceleration of a predetermined value or greater, the inflator 16 is actuated. The inflator 16 is connected to an air bag body 20 via a gas guiding pipe 18. Gas emitted from the inflator 16 flows into the air bag body 20 via the gas guiding pipe 18.

The air bag body 20 covers substantially the upper half of a front side window 22. At the time of a side collision, the air bag body 20 protects a head portion 24A of a vehicle occupant 24 seated in the driver's seat 12.

Figure 1:
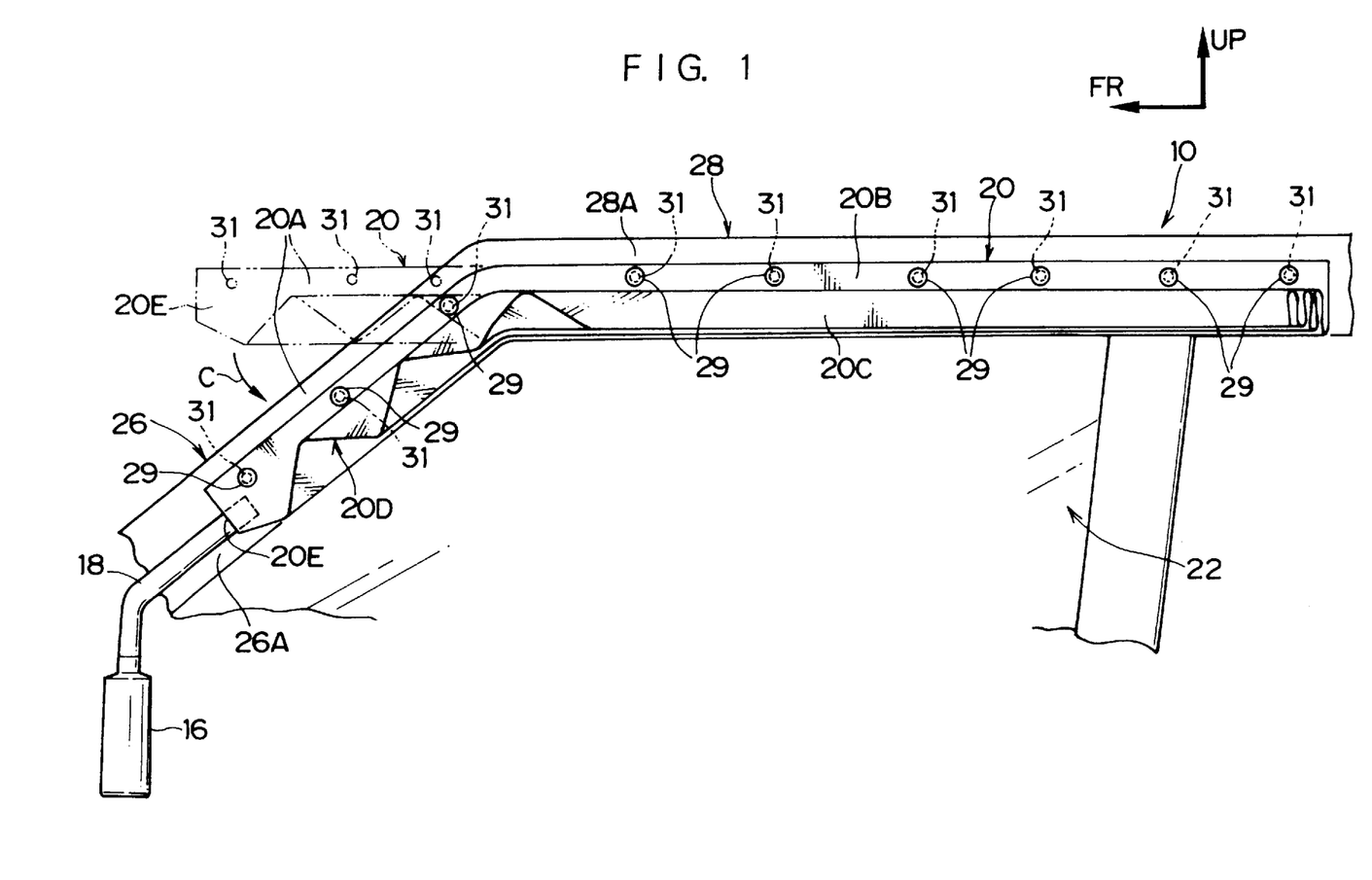
FIG. 1 is a side view illustrating an air bag device relating to an embodiment of the present invention.

As illustrated in FIG. 1, a front pillar mounting portion 20A of the air bag body 20 is fixed to a vehicle inner side portion 26A of a front pillar 26 of the vehicle 10 by fixing members 29 such as bolts or the like. A roof side rail mounting portion 20B of the air bag body 20 is fixed to a vehicle inner side portion 28A of a roof side rail 28 by the fixing members 29 such as bolts or the like. The fixing members 29 are inserted into mounting holes 31 which are formed at predetermined intervals in the front pillar mounting portion 20A and the roof side rail mounting portion 20B.

Figure 4:
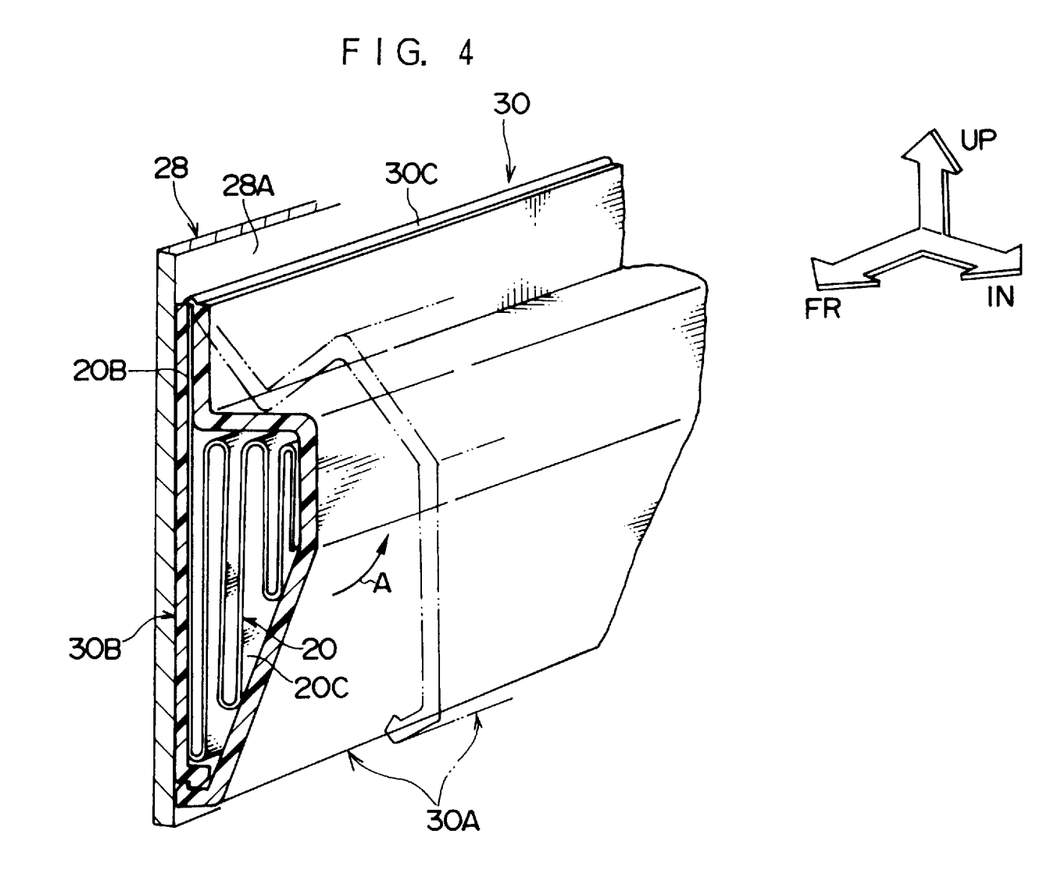
FIG. 4 is a perspective view, as seen from an inner side of a vehicle, illustrating in partial cross-section an accommodated state of the air bag body of the air bag device relating to the embodiment of the present invention.

As illustrated in FIG. 4, the air bag body 20 is accommodated in a housing 30 in a folded state. The housing 30 extends along the front pillar and the roof side rail 28, and includes a lid 30A and a base 30B. The base 30B is, together with the air bag body 20, fixed to the vehicle inner side portion 26A of the front pillar 26 and to the vehicle inner side portion 28A of the roof side rail 28 by fixing members such as bolts. When the air bag body 20 unfolds, the lid 30A is, due to the expanding/unfolding force of the air bag body 20, pivoted upwardly (in the direction of arrow A in FIG. 4) around a hinge portion 30C formed at the upper edge portion of the lid 30A, so as to open to the position illustrated by the imaginary line in FIG. 4.

Figure 3:
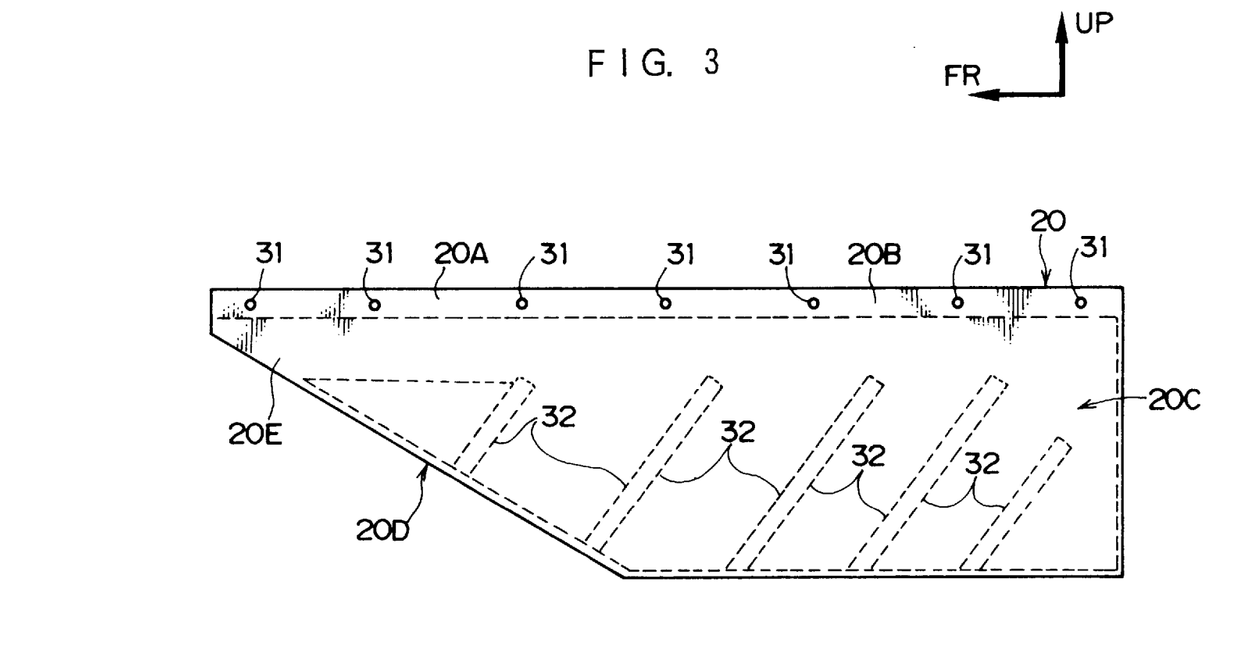
FIG. 3 is a side view illustrating a state before the air bag body of the air bag device relating to the embodiment of the present invention is folded.

As shown in FIG. 3, the widthwise direction of the air bag body 20 is the vertical direction of the vehicle, and the lengthwise direction of the air bag body 20 is the longitudinal direction of the vehicle. A front end portion 20D of the air bag body 20 forms a substantial rectangle whose width gradually decreases. The air bag body 20 is formed into a bag body by two pieces of fabric being placed one on top of the other and the outer peripheral portions thereof being sewn together. The front pillar mounting portion 20A and the roof side rail mounting portion 20B of the air bag body 20 are formed on the same straight line, and a curtain-like bag body main body 20C is formed therebeneath.

Figure 5:
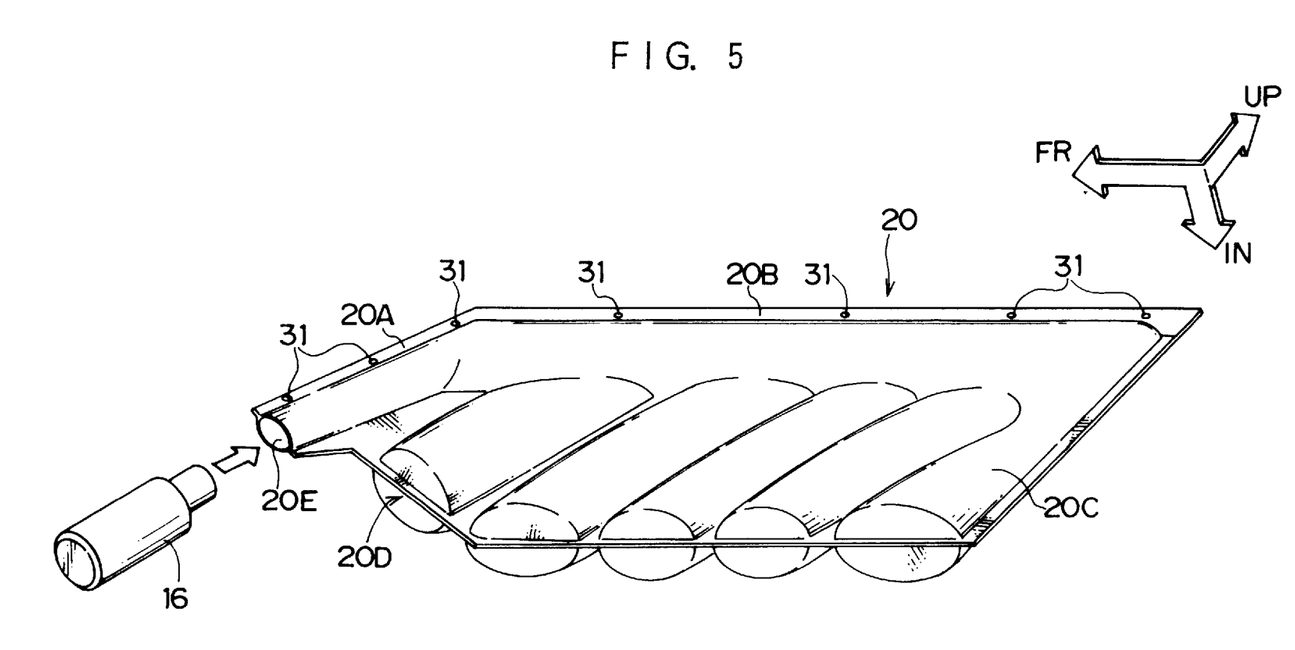
FIG. 5 is a perspective view, as seen from the inner side of the vehicle, illustrating an unfolded state of the air bag body of the air bag device relating to the embodiment of the present invention.

An opening portion 20E is formed at the front edge of the air bag body 20. The gas guiding pipe 18 (see FIG. 1) is connected to the opening portion 20E. Sewn portions 32 are formed at the bag body main body 20C as illustrated by the dash lines in FIG. 3. The sewn portions 32 are formed at predetermined intervals in the longitudinal direction of the vehicle, and are formed from the vehicle lower side end portion of the bag body main body 20C at an upward slant toward the rear of the vehicle. When the air bag body 20 unfolds, as illustrated in FIG. 5, due to the gas emitted from the inflator 16, the air bag body 20 inflates into an air-mattress-like configuration so as to form a plurality of air chambers.

Next, the way of folding the air bag body 20 will be described.

Figure 2:
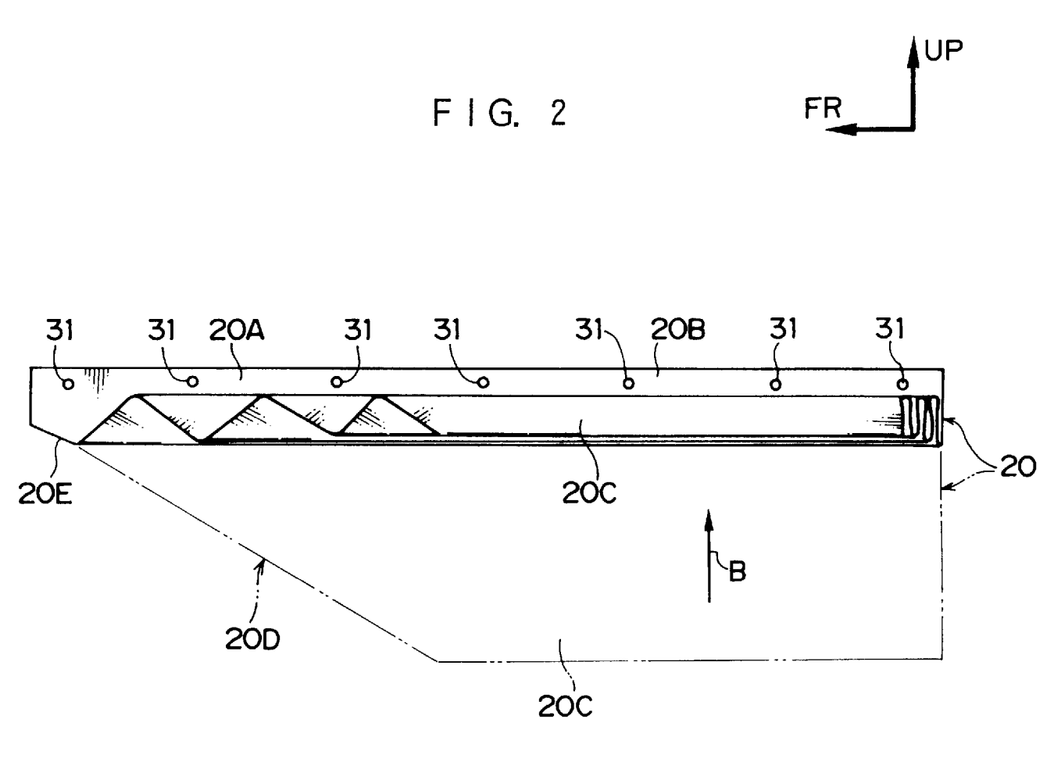
FIG. 2 is a side view illustrating a state in which an air bag body of the air bag device relating to the embodiment of the present invention is folded.

As shown in FIG. 2, first, the air bag body 20 illustrated by the imaginary line is folded into a bellows-like shape (accordion-like pleats) from the bottom to the top thereof (i.e., in the direction of arrow B in FIG. 2), so as to be set in the folded state illustrated by the solid line. Next, the front pillar mounting portion 20A of the air bag body 20, which is in the folded state illustrated by the imaginary line in FIG. 1, is bent in a direction so as to run along the front pillar 26 (in the direction of arrow C in FIG. 1), so that the air bag body 20 is set in the mounted/stored state illustrated by the solid line in FIG. 1.

Next, operation of the present embodiment will be described.

In the air bag device of the present embodiment, when the inflator 16 is actuated at the time of a side collision, gas is emitted from the inflator 16 and is sent into the air bag body 20 via the gas guiding pipe 18, so that the air bag body 20 expands and unfolds. Due to the force of the expansion and unfolding of the air bag body 20 at this time, the lid 30A of the housing 30 opens, and the air bag body 20 unfolds at the side of the head portion 24A of the vehicle occupant 24.

At this time, tension in the longitudinal direction of the vehicle is applied to the air bag body 20 due to the expanding and unfolding thereof, and the air bag body 20 can restrain the head portion 24A of the vehicle occupant 24.

The front pillar mounting portion 20A and the roof side rail mounting portion 20B of the air bag device 20 of the present embodiment are formed on the same straight line. As shown in FIG. 2, first, the air bag body 20 illustrated by the imaginary line is folded from the bottom to the top (i.e., in the direction of arrow B) in a bellows-like shape so as to be set in the folded state illustrated by the solid line. Therefore, the folding workability is good, and the thickness of the air bag body 20 in the folded state is substantially uniform.

Thereafter, as shown in FIG. 1, the front pillar mounting portion 20A is bent in a direction so as to run along the front pillar 26 (i.e., in the direction of arrow C in FIG. 1), so that the air bag body 20 is set in the mounted/stored state illustrated by the solid line in FIG. 1. Therefore, even in this mounted/stored state, the thickness of the air bag body 20 can be made substantially uniform although the thickness of the bent portion is slightly greater. Therefore, the ease and convenience of mounting and accommodating the air bag body 20, which is accommodated in the housing 30 along the front pillar 26 and the roof side rail 28, improves.

The front pillar mounting portion 20A and the roof side rail mounting portion 20B of the air bag body 20 of the present embodiment are formed on the same straight line. Therefore, it is difficult for folding creases to form in the front pillar mounting portion 20A and the roof side rail mounting portion 20B.

Figure 7:
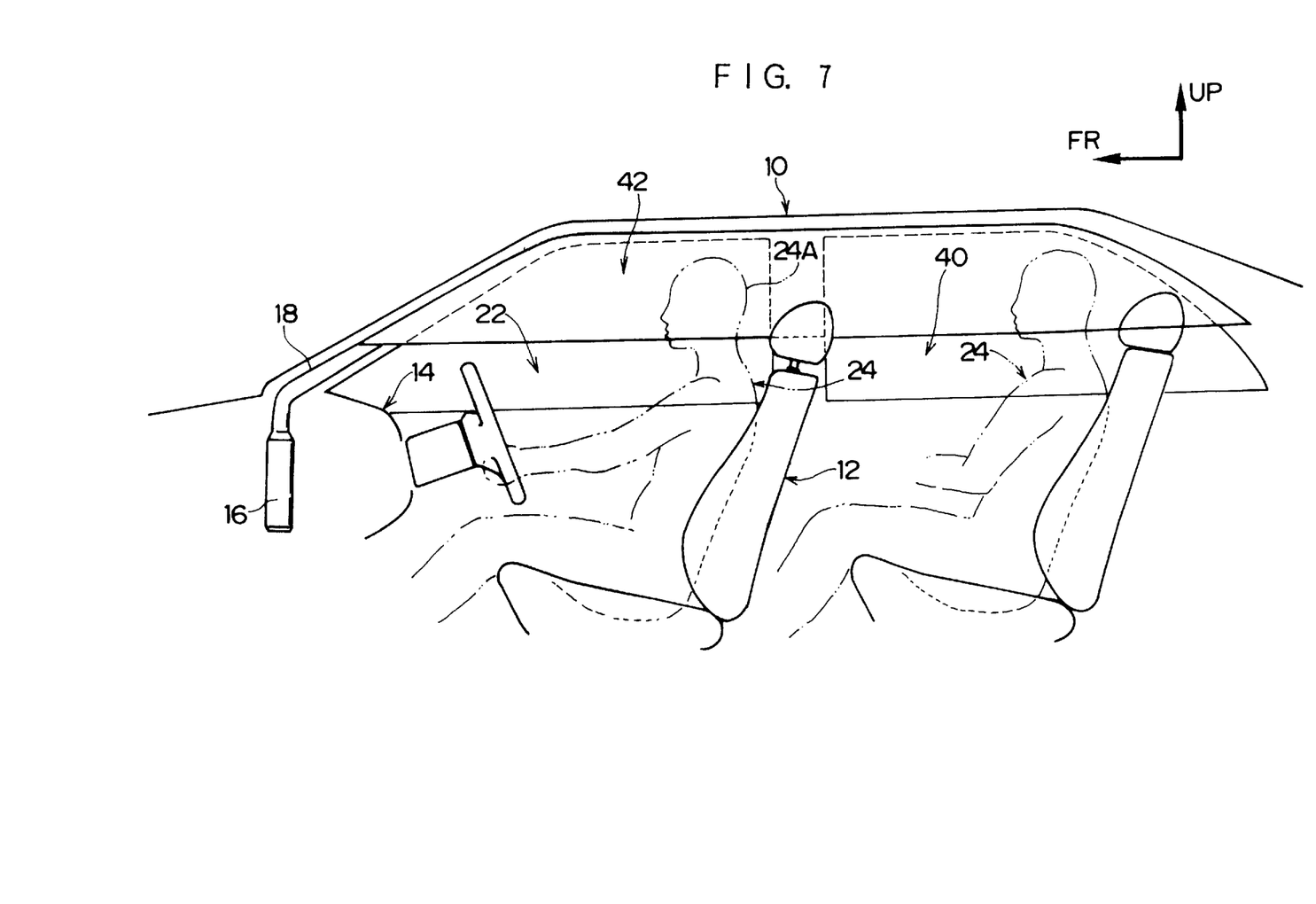
FIG. 7 is a schematic side view illustrating a portion of a vehicle to which an air bag device relating to another embodiment of the present invention is applied.

Although a specific embodiment of the present invention has been described herein in detail, the present invention is not limited to the above-described embodiment, and it should be clear to a person skilled in the art that a variety of embodiments are possible within the scope of the present invention. For example, the air bag device of the above-described embodiment is applied to an air bag device equipped with the air bag body 20 which covers substantially the upper half of the front side window 22 as illustrated in FIG. 6. However, the air bag device of the present invention can also be applied to an air bag device such as that illustrated in FIG. 7 which is equipped with an air bag body 42 which covers both substantially the upper half of the front side window 22 and substantially the upper half of a rear side window 40. In this case, the air bag device which is provided from the roof side rail to the rear pillar is provided symmetrically to the air bag device illustrated in FIG. 1. In a case in which the air bag device is provided from the roof side rail only to the rear pillar, the air bag device is provided symmetrically to the air bag device illustrated in FIG. 1. Moreover, in the air bag device of the above-described embodiment, the air bag body 20 is folded in a bellows-shape from bottom to top (i.e., in the direction of arrow B of FIG. 2). However, instead of being folded in a bellows-like shape, the air bag body 20 may be folded in another configuration, e.g., may be rolled into a roll form from the bottom to the top.

What is claimed is:

1. An air bag device which, at the time of a collision, unfolds a curtain-shaped air bag body which is mounted and accommodated at a roof side rail of a vehicle, said device comprising:

an air bag body having a roof side rail mounting portion which is mounted along the roof side rail and a pillar mounting portion mounted along a pillar, said roof side rail mounting portion and said pillar mounting portion being initially formed on a same straight line, wherein a main body of said curtain-shaped bag body is formed beneath said roof side rail mounting portion and said pillar mounting portion and extends in a straight line when said main body is unfolded, and said air bag body is folded from a bottom portion thereof to a top portion thereof in a direction transverse to said roof side rail mounting portion and said pillar mounting portion with a plurality of folds extending generally parallel to said roof side rail mounting portion and said pillar mounting portion and is bent so as to form the roof side rail mounting portion running along the roof side rail and the pillar mounting portion running along at least one of the front pillar and the rear pillar with a portion of the plurality of folds maintained in a generally parallel orientation with respect to said roof side rail mounting portion and another portion of the plurality of folds maintained in a generally parallel orientation with respect to said pillar mounting portion.

2. An air bag device according to claim 1, further comprising:

fixing members which mount said roof side rail mounting portion and said pillar mounting portion to the roof side rail and the at least one of the front pillar and the rear pillar, respectively.

3. An air bag device according to claim 2, wherein said roof side rail mounting portion and said pillar mounting portion have mounting holes and are mounted to the roof side rail and the at least one of the front pillar and the rear pillar by said fixing members being inserted into said mounting holes.

4. An air bag device according to claim 1, wherein when said bag body main body is in an unfolded and uninflated state, a widthwise direction dimension of a front end portion of said bag body main body becomes smaller toward a longitudinal direction end portion of said bag body main body.

5. An air bag device according to claim 1, wherein said bag body main body has a plurality of sewn portions, and when said air bag body unfolds, said plurality of sewn portions form a plurality of air chambers.

6. An air bag device according to claim 5, wherein said plurality of sewn portions are provided so as to be aligned parallel to each other at predetermined intervals.

7. An air bag device according to claim 1, wherein said bag body main body is folded into a bellows-shape.

8. An air bag device according to claim 1, further comprising:

a housing in which said air bag body is accommodated in a folded state.

9. An air bag device according to claim 8, wherein said housing has a lid and a base, and when said air bag body unfolds, said lid swings around a hinge portion of said housing.

10. An air bag device according to claim 9, wherein said base is mounted to the roof side rail and the at least one of the front pillar and the rear pillar by fixing members which mount said roof side rail mounting portion and said pillar mounting portion to the roof side rail and the at least one of the front pillar and the rear pillar, respectively.

11. An air bag device according to claim 4, wherein a bent portion of said air bag body is provided at the smaller widthwise direction dimension portion of said bag body main body.

12. An air bag device which, at the time of a collision, unfolds a curtain-shaped air bag body which is mounted and accommodated at a roof side rail of a vehicle, said device comprising:

an air bag body having a roof side rail mounting portion which is mounted along the roof side rail and a pillar mounting portion mounted alone a pillar, said roof side rail mounting portion and said pillar mounting portion being initially formed on a same straight line, wherein a main body of said curtain-shaped bag body is formed beneath said roof side rail mounting portion and said pillar mounting portion and extends in a straight line when said main body is unfolded, and said air bag body is folded in a bellows-shape from a bottom portion thereof to a top portion thereof in a direction transverse to said roof side rail mounting portion and said pillar mounting portion with a plurality of folds extending generally parallel to said roof side rail mounting portion and said pillar mounting portion and is bent so as to form the roof side rail mounting portion running along the roof side rail and the pillar mounting portion running along at least one of the front pillar and the rear pillar with a portion of the plurality of folds maintained in a generally parallel orientation with respect to said roof side rail mounting portion and another portion of the plurality of folds maintained in a generally parallel orientation with respect to said pillar mounting portion, and fixing members which mount said roof side rail mounting portion and said pillar mounting portion to the roof side rail and the at least one of the front pillar and the rear pillar, respectively, wherein, when said bag body main body is in an unfolded and uninflated state, a widthwise direction dimension of a front end portion of said bag body main body becomes smaller toward a longitudinal direction end portion of said bag body main body.

13. An air bag device according to claim 12, wherein said roof side rail mounting portion and said pillar mounting portion have mounting holes and are mounted to the roof side rail and the at least one of the front pillar and the rear pillar by said fixing members being inserted into said mounting holes.

14. An air bag device according to claim 12, wherein said bag body main body has a plurality of sewn portions, and when said air bag body unfolds, said plurality of sewn portions form a plurality of air chambers.

15. An air bag device according to claim 14, wherein said plurality of sewn portions are provided so as to be aligned parallel to each other at predetermined intervals.

16. An air bag device according to claim 12, further comprising:

a housing in which said air bag body is accommodated in a folded state.

17. An air bag device according to claim 16, wherein said housing has a lid and a base, and when said air bag body unfolds, said lid swings around a hinge portion of said housing, and said base is mounted to the roof side rail and the at least one of the front pillar and the rear pillar by fixing members which mount said roof side rail mounting portion and said pillar mounting portion to the roof side rail and the at least one of the front pillar and the rear pillar, respectively.

18. An air bag device according to claim 12, wherein a bent portion of said air bag body is provided at the smaller widthwise direction dimension portion of said bag body main body.

19. An air bag device which, at the time of a collision, unfolds a curtain-shaped air bag body which is mounted and accommodated at a roof side rail of a vehicle, said device comprising:

an air bag body having a roof side rail mounting portion which is mounted along the roof side rail and a pillar mounting portion mounted along a pillar, and said roof side rail mounting portion and said pillar mounting portion being initial formed on a same straight line, wherein a main body of said curtain-shaped bag body is formed beneath said roof side rail mounting portion and said pillar mounting portion and extends in a straight line when said main body is unfolded, and said air bag body is folded in a bellows-shape from a bottom portion thereof to a top portion thereof in a direction transverse to said roof side rail mounting portion and said pillar mounting portion with a plurality of folds extending generally parallel to said roof side rail mounting portion and said pillar mounting portion and is bent so as to form the roof side rail mounting portion running along the roof side rail and the pillar mounting portion running along at least one of the front pillar and the rear pillar with a portion of the plurality of folds maintained in a generally parallel orientation with respect to said roof side rail mounting portion and another portion of the plurality of folds maintained in a generally parallel orientation with respect to said pillar mounting portion, fixing members which mount said roof side rail mounting portion and said pillar mounting portion to the roof side rail and the at least one of the front pillar and the rear pillar, respectively, and a housing in which said air bag body is accommodated in a folded state, wherein, when said bag body main body is in an unfolded and uninflated state, a widthwise direction dimension of a front end portion of said bag body main body becomes smaller toward a longitudinal direction end portion of said bag body main body, and said roof side rail mounting portion and said pillar mounting portion have mounting holes and are mounted to the roof side rail and the at least one of the front pillar and the rear pillar by said fixing members being inserted into said mounting holes.

20. An air bag device according to claim 19, wherein said bag body main body has a plurality of sewn portions, and when said air bag body unfolds, said plurality of sewn portions form a plurality of air chambers.

21. An air bag device according to claim 20, wherein said plurality of sewn portions are provided so as to be aligned parallel to each other at predetermined intervals.

22. An air bag device according to claim 19, wherein said housing has a lid and a base, and when said air bag body unfolds, said lid swings around a hinge portion of said housing, and said base is mounted to the roof side rail and the at least one of the front pillar and the rear pillar by fixing members which mount said roof side rail mounting portion and said pillar mounting portion to the roof side rail and the at least one of the front pillar and the rear pillar, respectively.

23. An air bag device according to claim 19, wherein a bent portion of said air bag body is provided at the smaller widthwise direction dimension portion of said bag body main body.

\* \* \* \* \*

UNITED STATES PATENT AND TRADEMARK OFFICE
CERTIFICATE OF CORRECTION

PATENT NO. : 5,884,937
DATED : Mar. 23, 1999
INVENTOR(S) : Shuji Yamada

It is certified that error appears in the above-indentified patent and that said Letters Patent is hereby corrected as shown below:

On title page,
 change the Foreign Application Priority Data to:
Item
[30]  December 11, 1995  [JP]  JAPAN  7-321583

· change the References Cited Foreign Patent Documents Data to:

[56]  4307175 A1  9/1993  Germany

Signed and Sealed this

Fifth Day of October, 1999

Attest:

Q. TODD DICKINSON

*Attesting Officer*  *Acting Commissioner of Patents and Trademarks*